(12) United States Patent
Humfeld

(10) Patent No.: US 9,604,414 B2
(45) Date of Patent: Mar. 28, 2017

(54) METHODS OF FORMING A THINNED PREPREG SHEET

(71) Applicant: THE BOEING COMPANY, Chicago, IL (US)

(72) Inventor: Keith Daniel Humfeld, Federal Way, WA (US)

(73) Assignee: The Boeing Company, Chicago, IL (US)

(*) Notice: Subject to any disclaimer, the term of this patent is extended or adjusted under 35 U.S.C. 154(b) by 307 days.

(21) Appl. No.: 14/549,231

(22) Filed: Nov. 20, 2014

(65) Prior Publication Data
US 2016/0144607 A1 May 26, 2016

(51) Int. Cl.
| | |
|---|---|
| *B32B 37/08* | (2006.01) |
| *B32B 38/08* | (2006.01) |
| *C08J 5/24* | (2006.01) |
| *B29C 70/42* | (2006.01) |
| *B29C 70/46* | (2006.01) |
| *B29C 70/50* | (2006.01) |
| *B32B 38/00* | (2006.01) |

(52) U.S. Cl.
CPC .......... *B29C 70/465* (2013.01); *B29C 70/506* (2013.01); *B32B 37/08* (2013.01); *B32B 38/08* (2013.01); *C08J 5/24* (2013.01); *B32B 2038/0024* (2013.01); *B32B 2305/076* (2013.01)

(58) Field of Classification Search
CPC ............ B32B 37/08; B32B 2038/0024; B32B 38/0012; B32B 38/08; B32B 2305/076; C08J 5/24; B29C 70/40; B29C 70/42; B29C 70/46; B29C 70/465; B29C 70/50; B29C 70/504; B29C 70/506
See application file for complete search history.

(56) References Cited

U.S. PATENT DOCUMENTS 5,178,706 A * 1/1993 Nishibara ............. B29C 55/023
156/163

FOREIGN PATENT DOCUMENTS

JP         05-320382 A    * 12/1993

* cited by examiner

*Primary Examiner* — Michael Tolin
(74) *Attorney, Agent, or Firm* — Jay J. Hoette; The Small Patent Law Group, LLC

(57) ABSTRACT

A method of forming a thinned prepreg sheet is disclosed. The method comprises providing a first precursor sheet comprising reinforcement fibers impregnated with a matrix resin in a first state. The method also comprises forming a second precursor sheet having a first thickness by cooling the first precursor sheet until the matrix resin is transformed from the first state to a second state. The method further comprises forming a crushed sheet comprising interstices having an average size by crushing the second precursor sheet, where the crushed sheet has a second thickness. The method also comprises forming the thinned prepreg sheet by heating the crushed sheet until the matrix resin is transformed from the second state to a third state. The thinned prepreg sheet has a third thickness less than the first thickness of the second precursor sheet.

20 Claims, 6 Drawing Sheets

METHODS OF FORMING A THINNED PREPREG SHEET

BACKGROUND

Prepreg sheets are used for many different purposes, including aeronautical or other applications, such as building materials, industrial materials, medical materials, sports and leisure materials, and the like. A need exists for using thin prepreg sheets to produce smaller, thinner, and lighter-weight parts or structures, such as radomes, where electrical transparency may be important. Typically, a thinned prepreg sheet is fabricated by decreasing the thickness of its resin film via spreader bars. However, there are limits to thickness reduction achievable using this methodology. For example, as the resin film is spread thinner and thinner, uniformity of the material becomes difficult to control and a prepreg sheet with uneven distribution of resin and reinforcement fibers may become unsuitable for the intended application.

SUMMARY

Accordingly, apparatuses and methods, intended to address the above-identified concerns, would find utility.

The following is a non-exhaustive list of examples, which may or may not be claimed, of the subject matter according the present disclosure.

One example of the present disclosure relates to a method of forming a thinned prepreg sheet. The method comprises providing a first precursor sheet comprising reinforcement fibers impregnated with a matrix resin in a first state. The method also comprises forming a second precursor sheet having a first thickness by cooling the first precursor sheet until the matrix resin is transformed from the first state to a second state. The method further comprises forming a crushed sheet comprising interstices having an average size by crushing the second precursor sheet, where the crushed sheet has a second thickness. The method also comprises forming the thinned prepreg sheet by heating the crushed sheet until the matrix resin is transformed from the second state to a third state. The thinned prepreg sheet has a third thickness less than the first thickness of the second precursor sheet.

BRIEF DESCRIPTION OF THE DRAWINGS

Figure 1:
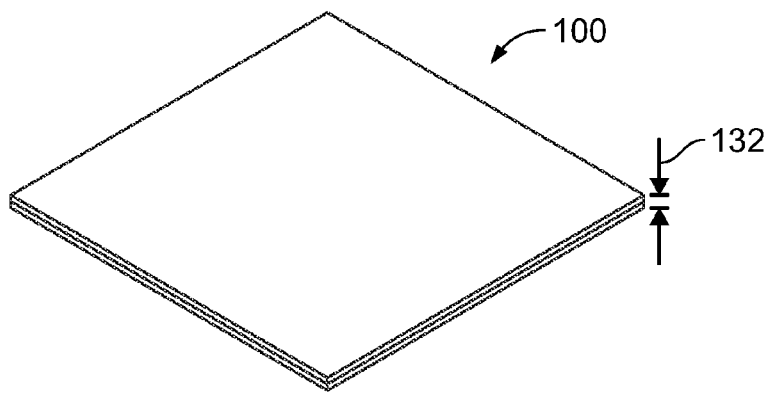
Figure 2:
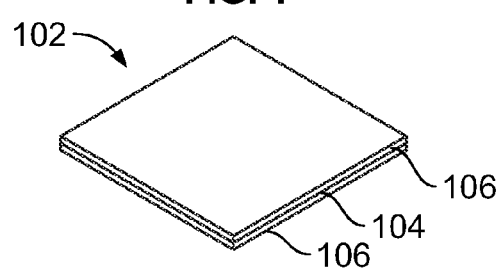
Figure 3:
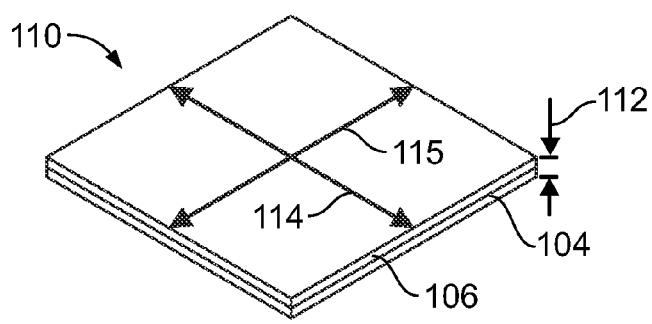
Figure 4:
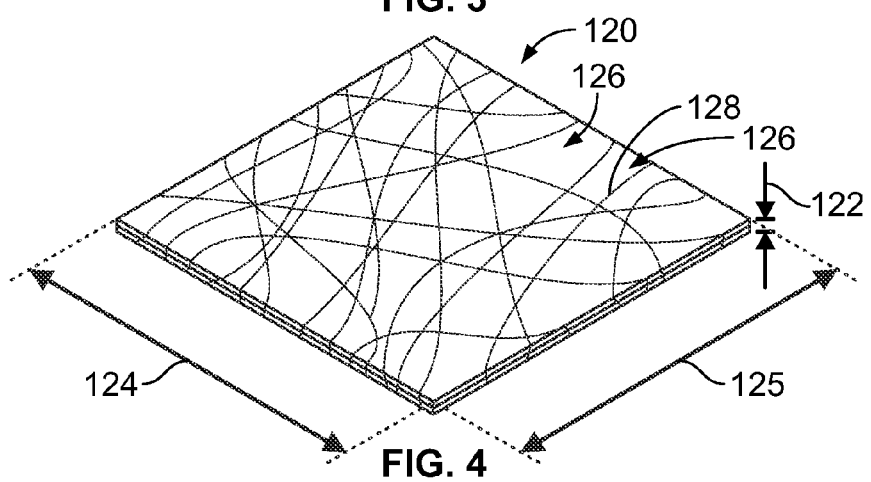
Figure 5:
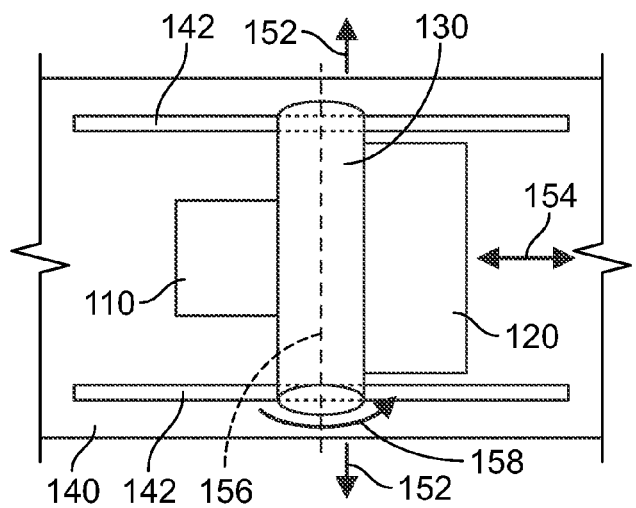
Figure 6:
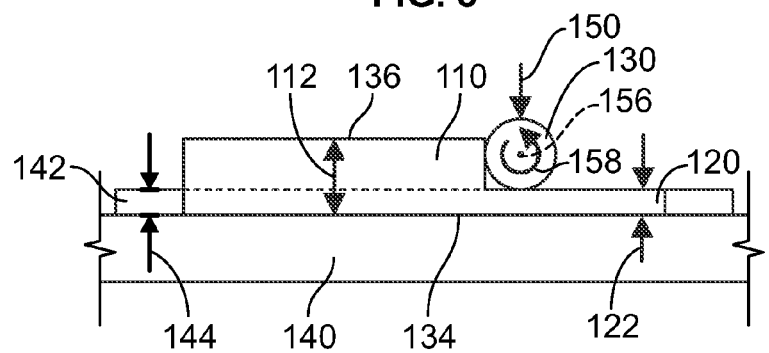
Figure 7:
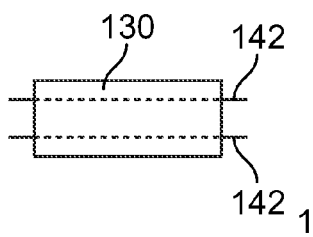
Figure 8:
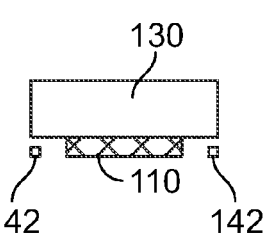
Figure 9:
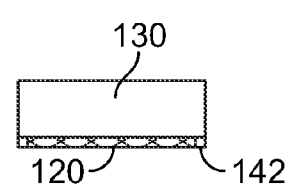
Figure 12:
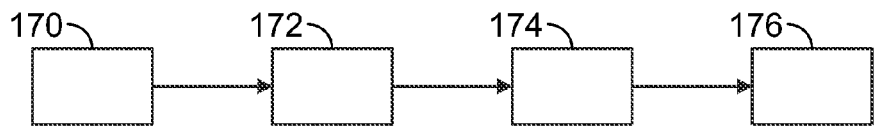
Figure 10:
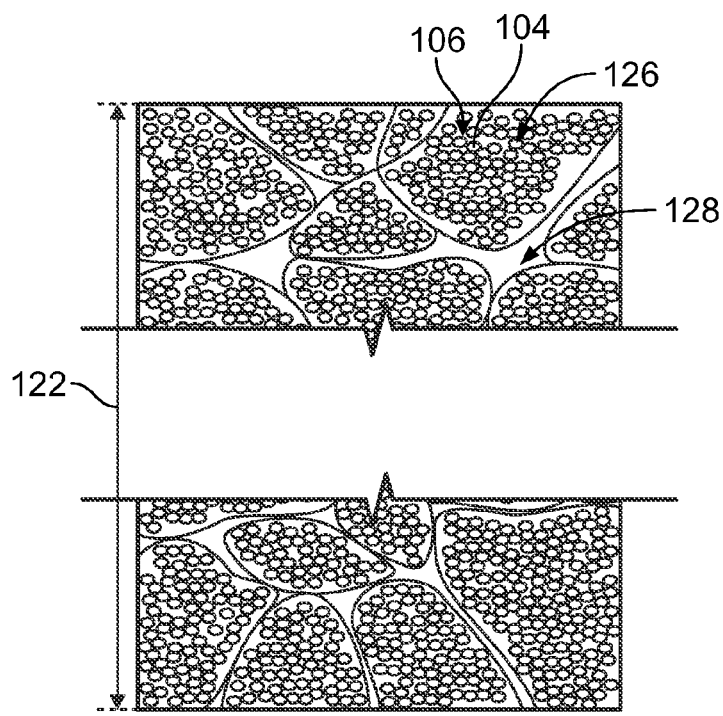
Figure 11:
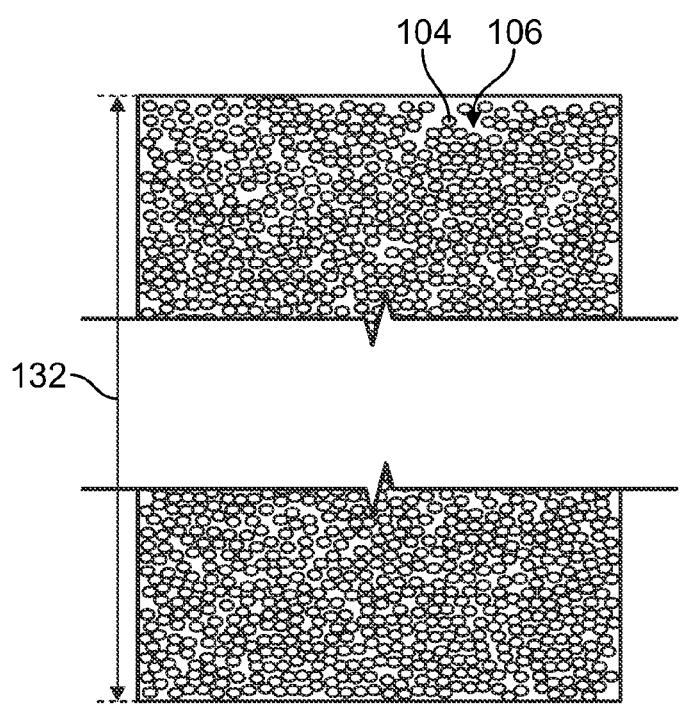
Figure 13:
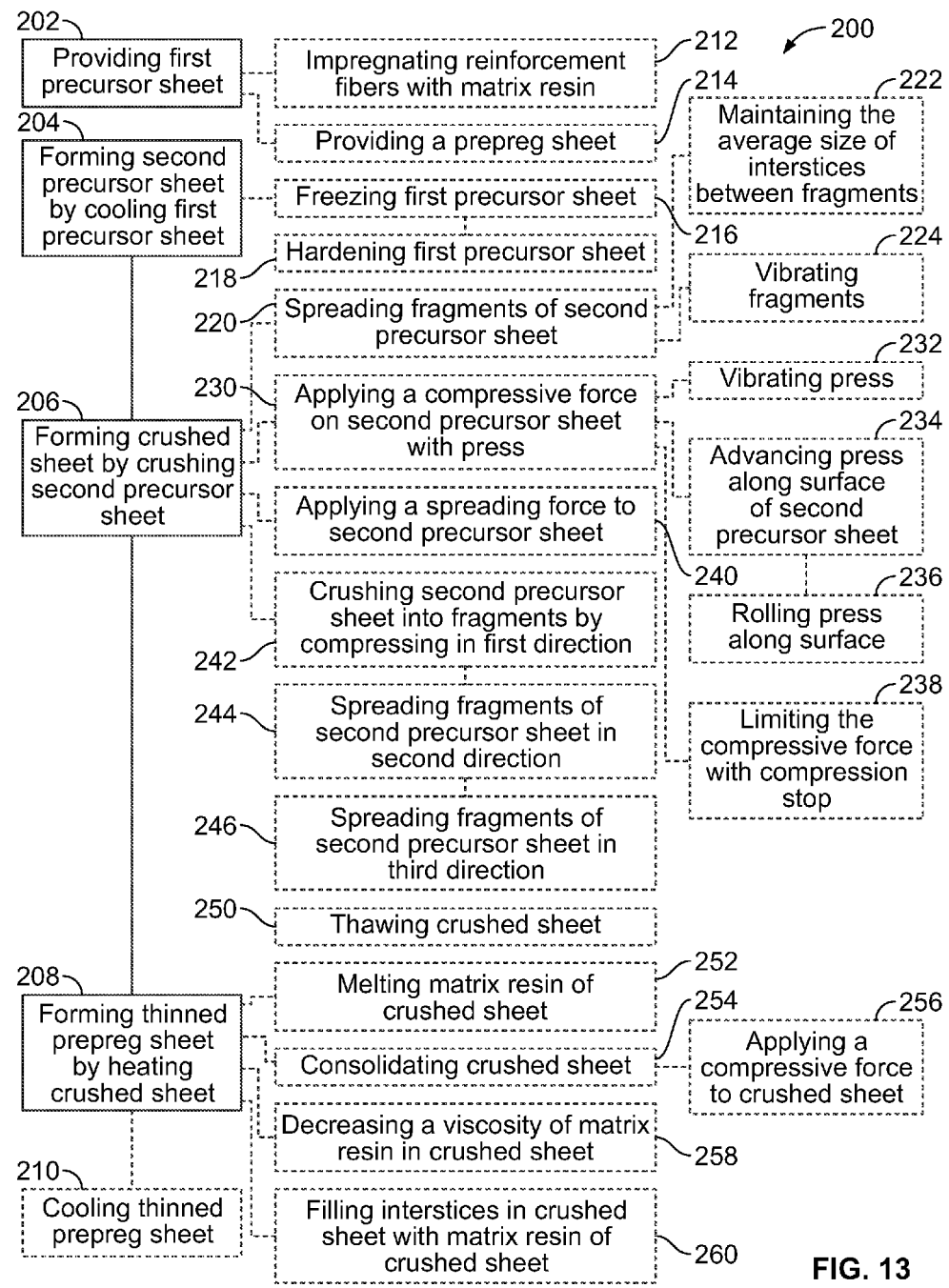
Figure 14:
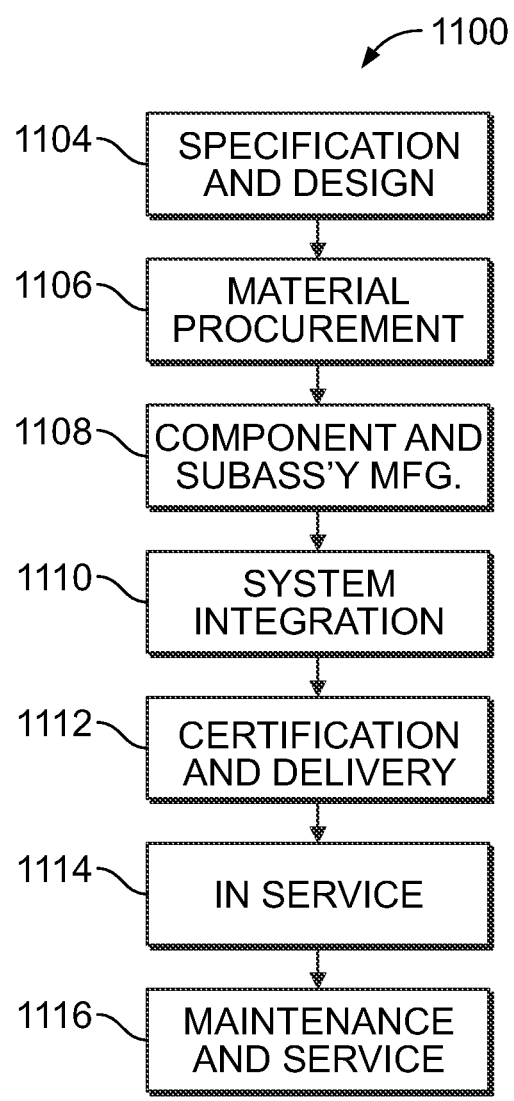

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic perspective view of a thinned prepreg sheet, according to one or more examples of the present disclosure;

FIG. 2 is a schematic perspective view of a first precursor sheet used to form the thinned prepreg sheet of FIG. 1, according to one or more examples of the present disclosure;

FIG. 3 is a schematic perspective view of a second precursor sheet used to form the thinned prepreg sheet of FIG. 1, according to one or more examples of the present disclosure;

FIG. 4 is a schematic perspective view of a crushed sheet used to form the thinned prepreg sheet of FIG. 1, according to one or more examples of the present disclosure;

FIG. 5 is a schematic top view of a press used to form the thinned prepreg sheet of FIG. 1, according to one or more examples of the present disclosure;

FIG. 6 is a schematic side view of the press of FIG. 5, according to one or more examples of the present disclosure;

FIG. 7 is a schematic top view of a press used to form the thinned prepreg sheet of FIG. 1, according to one or more examples of the present disclosure;

FIG. 8 is a schematic side view of the press of FIG. 7, according to one or more examples of the present disclosure;

FIG. 9 is a schematic side view of the press of FIG. 7, according to one or more examples of the present disclosure;

FIG. 10 is a schematic sectional view of the crushed sheet used to form the thinned prepreg sheet of FIG. 1, according to one or more examples of the present disclosure;

FIG. 11 is a schematic sectional view of the thinned prepreg sheet of FIG. 1, according to one or more examples of the present disclosure;

FIG. 12 is a block diagram of a system used to form the thinned prepreg sheet of FIG. 1, according to one or more examples of the present disclosure;

FIG. 13 is a block diagram of a method of forming the thinned prepreg sheet of FIG. 1, according to one or more examples of the present disclosure;

FIG. 14 is a block diagram of aircraft production and service methodology; and

Figure 15:
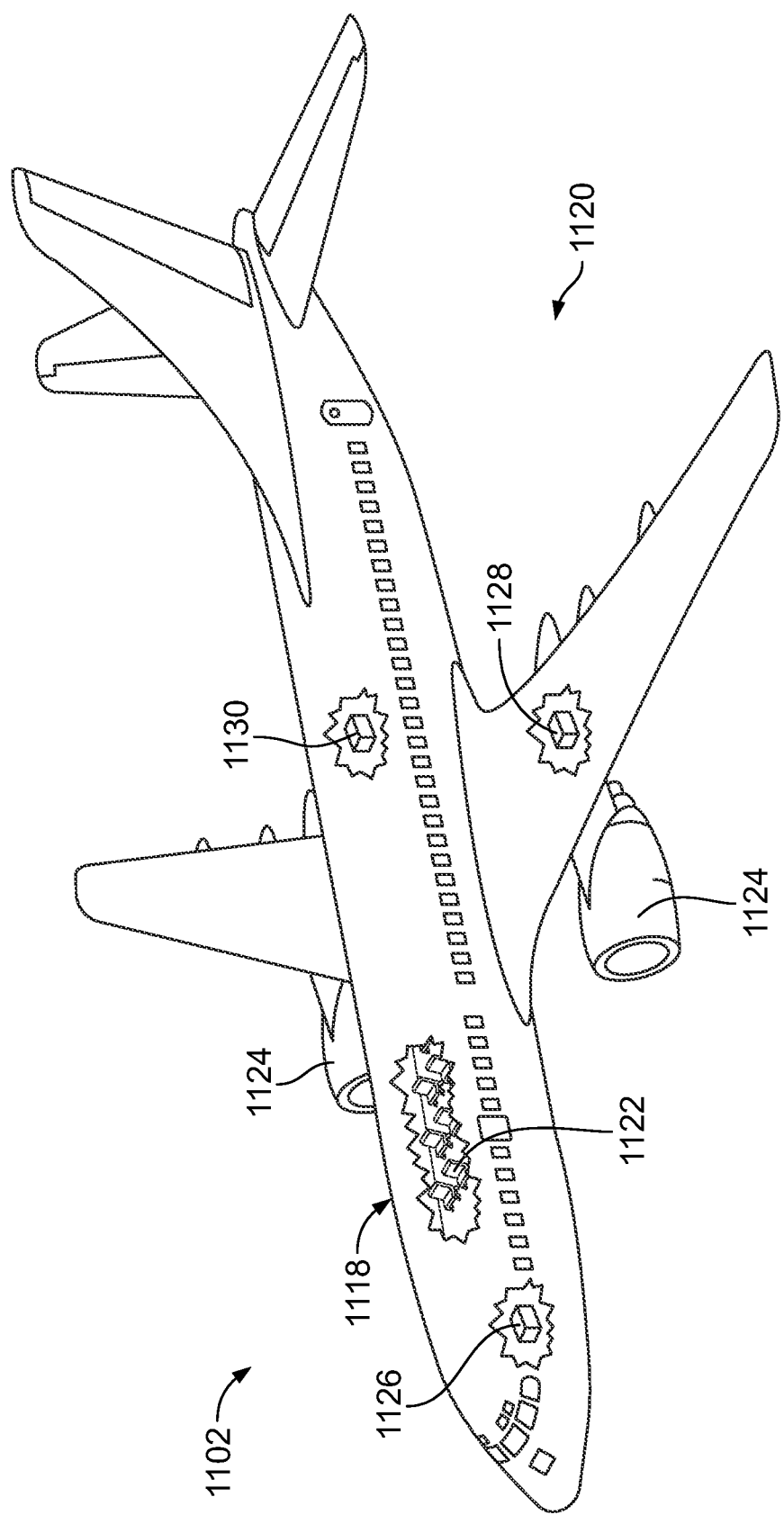

FIG. 15 is a schematic illustration of an aircraft.

DETAILED DESCRIPTION

In FIG. 12, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual (imaginary) elements may also be shown for clarity. Those skilled in the art will appreciate that some of the features illustrated in FIGS. 1-15 may be combined in various ways without the need to include other features described in FIGS. 1-15, other drawing figures, and/or the accompanying disclosure, even though such combination or combinations are not explicitly illustrated herein. Similarly, additional features not limited to the examples presented, may be combined with some or all of the features shown and described herein.

In FIGS. 13-14, referred to above, the blocks may represent operations and/or portions thereof and lines connecting the various blocks do not imply any particular order or dependency of the operations or portions thereof. Blocks represented by dashed lines indicate optional operations and/or portions thereof. Dashed lines, if any, connecting the various blocks represent optional dependencies of the operations or portions thereof. It will be understood that not all dependencies among the various disclosed operations are necessarily represented. FIGS. 13-14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring e.g., to FIGS. 1-4, 12, and 13, method 200 of forming thinned prepreg sheet 100 is disclosed. Method 200 comprises providing first precursor sheet 102 comprising reinforcement fibers 104 impregnated with matrix resin 106 in a first state (FIG. 13, block 202). Method 200 also comprises forming second precursor sheet 110 having first thickness 112 by cooling first precursor sheet 102 until matrix resin 106 is transformed from the first state to a second state (FIG. 13, block 204). Method 200 further comprises forming crushed sheet 120 (FIG. 13, block 206) comprising interstices 128 having an average size by crushing second precursor sheet 110 (FIG. 13, block 206), where crushed sheet 120 has second thickness 122. Method 200 also comprises forming thinned prepreg sheet 100 (FIG. 13, block 208) by heating crushed sheet 120 until matrix resin 106 is transformed from the second state to a third state (FIG. 13, block 208). Thinned prepreg sheet 100 has third thickness 132 less than first thickness 112 of second precursor sheet 110. The preceding subject matter of the instant paragraph is in accordance with example 1 of the present disclosure.

Thinned prepreg sheet 100 is formed by spreading the sheet, while maintaining uniformity of reinforcement fibers 104 in matrix resin 106. For example, various examples of methods described herein avoid the problem of spreading matrix resin to the sides leaving a sheet that is fiber-heavy in the middle and fiber-sparse at the edges. By cooling the sheet, matrix resin 106 may be crushed to form crushed sheet 120. Fragments 126 of crushed sheet 120 with interstices 128 between fragments 126 may be spread, which may widen and thin crushed sheet 120. When crushed sheet 120 is heated, matrix resin 106 is transformed, such as to uniformly fill interstices 128, which may further thin prepreg sheet 100.

The method 200 enables a manufacturer of prepreg sheets or a manufacturer of parts made from prepreg sheets to make uniform and thin prepreg sheet. Thinned prepreg sheet 100 may have use in various applications where industrial composites, such as industrial components and consumer goods, or advanced composites, such as in the aircraft or aerospace industry for military and commercial aircraft are used; however application is not limited thereto. Reinforcement fibers 104 and matrix resin 106 define a structure generally referred to herein as prepreg sheet or simply sheet. The prepreg sheet is processed and transformed between various states, which are described with reference to one or more examples described herein, to form thinned prepreg sheet 100. The various states may be defined by different characteristics of the sheet, such as temperature, hardness, viscosity, uniformity, thickness, width, state of cure, and the like. Some characteristics may be the same in different states, while other characteristics may be different in different states.

Reinforcement fibers 104 may include any type of reinforcement fibers used in prepregs. For example, reinforcement fibers 104 may be carbon fibers, graphite fibers, aramid fibers, glass fibers, Kevlar fibers, and the like. Reinforcement fibers 104 may be in various forms, including, but not limited to, yarns, ravings, chopped strands, woven fabrics, mats, and the like. Reinforcement fibers 104 are provided in first precursor sheet 102 in a generally uniform manner. For example, reinforcement fibers 104 may be generally uniformly distributed vertically throughout first precursor sheet 102. Reinforcement fibers 104 may be generally uniformly distributed horizontally throughout first precursor sheet 102. Reinforcement fibers 104 may be arranged in a generally uniformly parallel distribution. Alternatively, reinforcement fibers 104 may be in a weave pattern. Reinforcement fibers 104 may be layered throughout thickness 112 of first precursor sheet 102.

Matrix resin 106 may include any type of resin used in prepregs, including thermosetting resins or thermoplastic resins. Non-limiting examples of resins include epoxies, polyurethanes, phenolic and amino resins, bismaleimides, polyimides, polyamides, and the like. Matrix resin 106 includes curing agent(s), hardener(s) and/or other solvents, such as aromatic amines, aliphatic and cycloaliphatic amines, polyaminoamides, amides, and anhydrides, ketones, alcohols, chlorinated hydrocarbons, and the like. Reinforcement fibers 104 are impregnated with matrix resin 106 such that matrix resin 106 is generally uniformly distributed throughout first precursor sheet 102, such as around each of reinforcement fibers 104.

With reference particularly to FIG. 12, method 200 may be performed at different stations at one or more manufacturing plants. For example, at station 170, first precursor sheet 102 may be provided. For example, first precursor sheet 102 may be manufactured by impregnating reinforcement fibers 104 with matrix resin 106. Alternatively, rather than manufacturing first precursor sheet 102, first precursor sheet 102 may be pre-manufactured and shipped to manufacturer, such as in sheet form, on a reel, and the like. FIG. 2 illustrates an example of first precursor sheet 102.

At station 172, second precursor sheet 110 is formed. For example, station 172 may include a refrigeration unit used to cool first precursor sheet 102 to transform the sheet from the first state to the second state. Optionally, first precursor sheet 102 may be frozen at station 172. Cooling media, such as liquid nitrogen, may be used to decrease the cooling time and/or decrease the temperature of the sheet. FIG. 3 illustrates an example of second precursor sheet 110. Second precursor sheet 110 has thickness 112, width 114 and length 115, defining a volume of reinforcement fibers 104 and matrix resin 106.

At station 174, crushed sheet 120 is formed. For example, station 174 may include press 130 used to crush second precursor sheet 110. Press 130 may break or crack the sheet to form fragments 126 and interstices 128 between fragments 126. Optionally, fragments 126 may be spread outward to widen and/or lengthen crushed sheet 120, which may enable thinning of crushed sheet 120. FIG. 4 illustrates an example of crushed sheet 120. Crushed sheet 120 has thickness 122, width 124 and length 125. Optionally, thickness 122, width 124 and/or length 125 may be greater than thickness 112, width 114 and/or length 115; however the volume of crushed sheet 120 may still be equal to the volume of second precursor sheet 110.

At station 176, thinned prepreg sheet 100 is formed. For example, station 176 may include a heating unit, such as an oven, used to heat crushed sheet 120 to transform the sheet from the crushed state to the third state. Optionally, the cooled or frozen crushed fragments 126 may be heated and thawed at station 176 causing matrix resin 106 to become sufficiently flowable to consolidate thinned prepreg sheet 100 as a uniform structure. As matrix resin is thawed and/or melted, interstices 128 are filled in, which causes a thinning of the sheet. FIG. 1 illustrates an example of thinned prepreg sheet 100. Thinned prepreg sheet 100 has thickness 132, which is less than thickness 122. Optionally, thinned prepreg sheet 100 may have width 124 and length 125 equal to width 124 and length 125 of crushed sheet 120; however, in alternative embodiments, width and length of thinned prepreg sheet 100 may be different than crushed sheet 120.

Other stations may be provided in addition to, or in lieu of, stations 170-176. The sheet may undergo other processes. Optionally, one or more stations may be combined into a single station.

Referring generally to FIG. 2, the instant paragraph pertains to example 2 of the present disclosure. According to example 2, which includes the subject matter of example 1, above, in the first state, matrix resin 106 is uncured.

Uncured matrix resin 106 is able to be transformed and further processed, such as cooled to form second precursor sheet 110. Once cured, the sheet cannot be changed or reformed. Having matrix resin 106 uncured allows the manufacturer to use pressure to shape the sheet into a finished part prior to being cured.

Referring generally to FIG. 13 and particularly to e.g. FIGS. 10 and 11, the instant paragraph pertains to example 3 of the present disclosure. According to example 3, which includes the subject matter of any of examples 1-2, above, providing first precursor sheet 102 comprises impregnating reinforcement fibers 104 with matrix resin 106 in the first state (FIG. 13, block 212).

Impregnating reinforcement fibers 104 with matrix resin 106 bonds reinforcement fibers 104 together to form first precursor sheet 102. First precursor sheet 102 may be handled, stored or shipped.

Reinforcement fibers 104 may be laid out in a bed. Reinforcement fibers 104 may be arranged in bundles, with each bundle having a plurality of filaments. Many reinforcement fibers 104 are bundled together to form a tow, with the filaments generally arranged parallel. Reinforcement fibers 104 are spread thinly and uniformly in the form of a sheet and spaces may be defined between reinforcement fibers 104 and between the filaments of reinforcement fibers 104. The sheet is impregnated with matrix resin 106 by filling the spaces between and/or around the filaments. The filaments may be completely encased or surrounded. Optionally, a predetermined amount (e.g., volume or weight) of matrix resin 106 may be used to form first precursor sheet 102. The amount of matrix resin 106 may correspond with the amount (e.g., volume, weight, number, and diameter) of filaments and/or reinforcement fibers 104. Matrix resin 106 is viscous enough to impregnate the reinforcement fibers 104.

Referring generally to FIG. 13, the instant paragraph pertains to example 4 of the present disclosure. According to example 4, which includes the subject matter of example 3, above, in the first state, matrix resin 106 is sufficiently flowable to impregnate reinforcement fibers 104.

Having matrix resin 106 sufficiently flowable to impregnate reinforcement fibers 104 makes manufacturing first precursor sheet 102 feasible. For example, matrix resin 106 may be easily spread over the sheet or bed of reinforcement fibers 104 in a uniform manner.

Referring generally to FIG. 13, the instant paragraph pertains to example 5 of the present disclosure. According to example 5, which includes the subject matter of example 1, above, providing first precursor sheet 102 comprises providing a prepreg sheet (FIG. 13, block 214).

Starting the manufacturing process with a pre-formed prepreg sheet (e.g., a prepreg sheet previously impregnated with reinforcement fibers 104 and matrix resin 106) allows a manufacturer to form thinned prepreg sheet 100 without the need of equipment to form first precursor sheet 102 or expertise of forming first precursor sheet 102. Rather, the manufacturer may simply purchase pre-formed prepreg sheets and further process (e.g., forming second precursor sheet 110) the pre-formed prepreg sheets.

Referring generally to FIG. 13, the instant paragraph pertains to example 6 of the present disclosure. According to example 6, which includes the subject matter of example 5, above, in the first state, matrix resin 106 is partially cured.

When matrix resin 106 is partially cured, first precursor sheet 102 may be handled, stored or shipped. For example, matrix resin 106 has sufficient shape holding strength to allow first precursor sheet 102 to be handled.

Matrix resin 106 will cure when conditions are appropriate. Curing is a process that occurs over time. Curing occurs when matrix resin 106 is above a curing temperature. During curing, resin viscosity may initially drop upon application of heat and pass through a region of maximum flow and begin to increase as chemical reactions increase. When partially cured, the reaction between the resin and the curing agent or hardener of matrix resin 106 is not complete. Optionally, the matrix resin 106 may be in a gelatin state when partially cured. Optionally, matrix resin 106 may be in a B-stage when partially cured. In an exemplary embodiment, first precursor sheet 102 is cooled to limit or reduce a rate of curing of matrix resin 106.

Referring generally to FIGS. 4-9 and 13 and particularly to e.g. FIG. 10, the instant paragraph pertains to example 7 of the present disclosure. According to example 7, which includes the subject matter of any of examples 1-6, above, in the second state, matrix resin 106 is crushable.

Having matrix resin 106 crushable may allow thinning of the prepreg sheet. For example, once crushed, the pieces may be spread apart to thin the prepreg sheet.

Second precursor sheet 110 is formed by cooling first precursor sheet 102 until matrix resin 106 is transformed from a first state to a second state. By cooling matrix resin 106, matrix resin 106 is hardened. Matrix resin 106 may or may not have a phase change from a liquid state to a solid state when cooled; however, in the second state, matrix resin 106 is sufficiently hard that matrix resin 106 is crushable. For example, matrix resin 106 may have a viscosity of approximately 100,000 POISE to allow crushing to occur. Crushing may occur at lower viscosities in other embodiments. Matrix resin 106, being crushable, is able to be cracked, broken, separated into fragments, and the like with the application of pressure.

Referring generally to FIG. 13 and particularly to e.g. FIG. 11, the instant paragraph pertains to example 8 of the present disclosure. According to example 8, which includes the subject matter of any of examples 1-7, above, in the third state, matrix resin 106 is sufficiently flowable to fill interstices 128 of crushed sheet 120.

Having matrix resin 106 sufficiently flowable may allow thinning of the prepreg sheet. For example, being sufficiently flowable, matrix resin 106 is able to consolidate and fill in interstices 128. Because the same volume of matrix resin 106 is present from the second state to the third state, filling interstices 128 causes prepreg sheet to thin.

After being crushed, matrix resin 106 is heated to soften matrix resin 106 until matrix resin is mobile. Matrix resin 106 may or may not have a phase change from a solid or semi-solid state to a liquid or semi-liquid state when heated. In the third state, matrix resin 106 is sufficiently flowable that matrix resin 106 is movable.

Referring generally to FIG. 13, the instant paragraph pertains to example 9 of the present disclosure. According to example 9, which includes the subject matter of any of examples 1-8, above, matrix resin 106 of first precursor sheet 102 comprises a thermoset resin.

Thermoset resin enables manufacturing with reinforcement fibers 104. For example, thermoset resin is easy to work with during manufacture because thermoset resin may be liquid at room temperature making impregnating reinforcement fibers 104 easy. The thermoset resin may have resistance to solvents and corrosives, resistance to heat and high temperature, good fatigue strength, good elasticity, good adhesion properties, and good finishing properties.

Referring generally to FIG. 13, the instant paragraph pertains to example 10 of the present disclosure. According to example 10, which includes the subject matter of example 1, above, matrix resin 106 of first precursor sheet 102 comprises a thermoplastic resin.

The thermoplastic resin may be used with reinforcement fibers 104. The thermoplastic resin has the ability to be reformed.

Referring generally to FIG. 13 and particularly to e.g. FIGS. 3 and 4, the instant paragraph pertains to example 11 of the present disclosure. According to example 11, which includes the subject matter of any of examples 1-10, above, second thickness 122 of crushed sheet 120 is equal to first thickness 112 of second precursor sheet 110.

Second precursor sheet 110 is formed to have first thickness 112. Second precursor sheet 110 is then crushed to form crushed sheet 120, which has second thickness 122. During crushing, interstices 128 are formed, such as from cracks or breaks in crushed sheet 120. It is possible, after crushing second precursor sheet 110 to form crushed sheet 120, crushed sheet 120 may have second thickness 122 equal to first thickness 112 of second precursor sheet 110. For example, the crushing may form cracks or breaks but does not reduce thickness of the sheet.

Interstices 128 allow spreading of crushed sheet 120, which may be used to allow thinning of the prepreg sheet.

Referring generally to FIG. 13 and particularly to e.g. FIGS. 3 and 4, the instant paragraph pertains to example 12 of the present disclosure. According to example 12, which includes the subject matter of any of examples 1-10, above, second thickness 122 of crushed sheet 120 is less than first thickness 112 of second precursor sheet 110.

Fragments 126 may be compressed and/or spread out to reduce the thickness of crushed sheet 120. Crushing the sheet to reduce the thickness at least partially thins the prepreg sheet. Crushing the sheet allows uniform spreading of reinforcement fibers 104 and matrix resin 106.

Second precursor sheet 110 is formed to have first thickness 112. Second precursor sheet 110 is then crushed to form crushed sheet 120, which has second thickness 122. During crushing, interstices 128 are formed, such as from cracks or breaks in crushed sheet 120. It is possible, during crushing of second precursor sheet 110 to form crushed sheet 120, the thickness may be reduced, such as by spreading out of fragments 126 (see, e.g., FIGS. 6 and 8-9).

Referring generally to FIG. 13 and particularly to e.g. FIGS. 3 and 4, the instant paragraph pertains to example 13 of the present disclosure. According to example 13, which includes the subject matter of any of examples 1-10, above, second thickness 122 of crushed sheet 102 is less than half of first thickness 112 of second precursor sheet 110.

Fragments 126 may be compressed and/or spread out to reduce the thickness of crushed sheet 120. Crushing the sheet to reduce the thickness at least partially thins the prepreg sheet. Crushing the sheet allows uniform spreading of reinforcement fibers 104 and matrix resin 106.

Second precursor sheet 110 is formed to have first thickness 112. Second precursor sheet 110 is then crushed to form crushed sheet 120, which has second thickness 122. During crushing, interstices 128 are formed, such as from cracks or breaks in crushed sheet 120. It is possible, during crushing of second precursor sheet 110 to form crushed sheet 120, the thickness may be reduced by at least half.

Referring generally to FIG. 13, the instant paragraph pertains to example 14 of the present disclosure. According to example 14, which includes the subject matter of any of examples 1-13, above, cooling first precursor sheet 102 until matrix resin 106 is transformed from the first state to the second state comprises freezing first precursor sheet 102 (FIG. 13, block 216).

Freezing first precursor sheet 102 enables second precursor sheet 110 to be crushed. Crushing of second precursor sheet 110 allows the prepreg sheet to be thinned. Freezing matrix resin 106 maintains relative position of matrix resin 106 to reinforcement fibers 104 such that, when second precursor sheet 110 is crushed, both matrix resin 106 and corresponding reinforcement fibers 104 are uniformly spread during the thinning process.

First precursor sheet 102 may be stored in a cooled state, such as to reduce curing of matrix resin 106. Optionally, immediately after forming first precursor sheet 102, such as when matrix resin 106 is fluid and has low viscosity, first precursor sheet 102 may be cooled to harden matrix resin 106 and increase viscosity of matrix resin 106. In some embodiments, first precursor sheet 102 may be cooled in a refrigeration unit. Optionally, first precursor sheet 102 may be cooled using liquid nitrogen or other cooling media.

The temperature at which matrix resin is transformed from first state to second state may vary depending on the type of resin and/or other constituents in the matrix. For example, some matrix resins 106 may freeze at room temperature, other matrix resins may freeze above room temperature, while other matrix resins may freeze at below room temperature. First precursor sheet 102 may be cooled to at or below 0° C.

The freezing point of first precursor sheet 102 is the temperature below which matrix resin 106 is not significantly fluid. A phase change from a liquid or semi-liquid state to a solid or semi-solid state may not be required for matrix resin 106 to be considered not significantly fluid or frozen. The freezing point of matrix resin 106 may be considered to be the temperature below which the viscosity of matrix resin 106 is sufficiently un-flowable. For example, the viscosity of matrix resin 106 is high enough that it does not have time to flow significantly in response to an applied crushing force in the time scale during which the crushing force is applied, and instead reacts to that force in a similar manner as a solid, such as by breaking or crushing. In some embodiments, the freezing point of matrix resin 106 may be at/or above 100,000 POISE depending on the time scale over which the force could be applied; however, the freezing point may be a temperature associated with a lower viscosity.

Referring generally to FIG. 13, the instant paragraph pertains to example 15 of the present disclosure. According to example 15, which includes the subject matter of example 14, above, freezing first precursor sheet 102 comprises hardening first precursor sheet 102 (block 218).

Hardening enables second precursor sheet 110 to be crushed. Crushing of second precursor sheet 110 allows the prepreg sheet to be thinned.

First precursor sheet 102 may be stored in a cooled state, such as to reduce curing of matrix resin 106. Optionally, immediately after forming first precursor sheet 102, such as when matrix resin 106 is fluid and has low viscosity, first precursor sheet 102 may be cooled to harden matrix resin 106 and increase viscosity of matrix resin 106. Optionally, matrix resin may be hardened until frozen. In some embodiments, matrix resin 106 may be hardened to at/or above 100,000 POISE; however, matrix resin 106 may be hardened to a lower viscosity in other embodiments.

Referring generally to FIG. 13, the instant paragraph pertains to example 16 of the present disclosure. According to example 16, which includes the subject matter of any of examples 1-15, above, cooling first precursor sheet 102 until matrix resin 106 is transformed from the first state to the second state comprises cooling first precursor sheet 102 at a rate sufficient to induce thermal stress in matrix resin 106.

Cooling first precursor sheet 102 at a rate sufficient to induce thermal stress in matrix resin 106 allows formation of micro cracks in matrix resin 106. During crushing, matrix resin 106 may more easily and/or uniformly crush and separate in the areas of thermal stress in matrix resin 106.

Referring generally to FIG. 13 and particularly to e.g. FIG. 10, the instant paragraph pertains to example 17 of the present disclosure. According to example 17, which includes the subject matter of any of examples 1-16, above, forming crushed sheet 120 further comprises crushing second precursor sheet 110 into fragments 126 partially separated by interstices 128.

Separating second precursor sheet 110 into fragments 126 enables spreading of fragments 126 to widen crushed sheet 120. When fragments 126 are spread, crushed sheet 120 may be thinned.

Second precursor sheet 110 is crushed into fragments 126 partially separated by interstices 128 (see, e.g., FIG. 10). Each fragment 126 includes matrix resin 106 and corresponding reinforcement fibers 104. Interstices 128 are cracks in crushed sheet 120 that separate crushed sheet 120 into corresponding fragments 126. Fragments 126 rest on, or abut against, other fragments 126 within crushed sheet 120. For example, crushed sheet 120 may include a pile of fragments 120 spread out on substrate 140. Fragments 126 are separate from other fragments 126 and may be moved relative to each other, such as during spreading of crushed sheet 120, but fragments 126 do touch and rest on each other.

Referring generally to FIG. 13 and particularly to e.g. FIG. 5, the instant paragraph pertains to example 18 of the present disclosure. According to example 18, which includes the subject matter of example 17, above, forming crushed sheet 120 further comprises spreading fragments 126 of second precursor sheet 110 along a plane (FIG. 13, block 220).

Fragments 126 of second precursor 110 are spread along a plane, such as a plane parallel to second precursor sheet 110. Second precursor sheet 110 may be supported along substrate 140. Fragments 126 may be spread out on substrate 140. Spreading of fragments 126 enable thinning of crushed sheet 120.

Referring generally to FIG. 13, the instant paragraph pertains to example 19 of the present disclosure. According to example 19, which includes the subject matter of example 18, above, spreading fragments 126 of second precursor sheet 110 along the plane comprises maintaining the average size of interstices 128 between fragments 126 (block 222).

Fragments 126 of second precursor sheet 110 are spread along plane while maintaining an average size of interstices 128 between fragments 126. For example, fragments 126 remain in close contact with each other. Interstices 128 are small spaces between fragments 126 and, even when spread, interstices 128 remain small spaces between fragments 126. For example, prior to spreading, many layers of fragments 126 may be provided and, after spreading, fewer layers of fragments 126 are provided; however the average size of interstices 128 is maintained irrespective of the number of layers. Spreading of fragments 126 corresponds to thinning of crushed sheet 120.

Referring generally to FIG. 13, the instant paragraph pertains to example 20 of the present disclosure. According to example 20, which includes the subject matter of any of examples 18-19, above, spreading fragments 126 of second precursor sheet 110 along the plane comprises vibrating fragments 126 (block 224).

Vibration induces lateral movement of fragments 126 to spread fragments 126. Crushed sheet 120 is thinned as fragments 126 are spread.

Vibrating second precursor sheet 110 allows fragments 126 to be spread outward, such as to widen crushed sheet 120. Substrate 140 supporting second precursor sheet 110 may be vibrated. Alternatively, press 130 crushing second precursor sheet 110 may be vibrated to spread fragments 126.

Referring generally to FIG. 13 and particularly to e.g. FIG. 6, the instant paragraph pertains to example 21 of the present disclosure. According to example 21, which includes the subject matter of any of examples 17-19, above, forming crushed sheet 120 further comprises applying a compressive force to second precursor sheet 110 with press 130 (FIG. 13, block 230).

Compressive force of press 130 crushes second precursor sheet 110 to form interstices 128 and fragments 126. Fragments 126 may be spread to thin the prepreg sheet.

Press 130 is used to exert a compressive force on second precursor sheet 110 to crush second precursor sheet 110. Press 130 may be a roller rolled along substrate 140 of second precursor sheet 110 (see, e.g., FIGS. 5-6). Other types of presses may be used in alternative embodiments, such as a plate used to exert compressive force on a portion or the entire second precursor sheet 110 (see, e.g., FIGS. 7-9). The plate may be larger than crushed sheet 120 to crush entire crushed sheet 120 at once. Alternatively, the plate may be smaller than crushed sheet 120 to crush only a portion of crushed sheet 120 at a time. The compressive force exerted by press 130 cracks and crushes second precursor sheet 110. Optionally, thickness 122 of the prepreg sheet may be reduced during crushing. Optionally, press 130 may be used to spread fragments 126 in addition to compressing second precursor sheet 110. For example, FIGS. 5-6 illustrate the sheet being both thinned and spread outward by roller-type press 130. Similarly, FIGS. 8-9 illustrate the sheet being both thinned and spread outward by plate-type press 130.

Referring generally to FIG. 13, the instant paragraph pertains to example 22 of the present disclosure. According to example 22, which includes the subject matter of example 21, above, forming crushed sheet 120 further comprises vibrating press 130 (block 232).

Press 130 is vibrated while exerting the compressive force to spread fragments 126. For example, press 130 may be vibrated side-to-side along axis 156. Spreading of fragments 126 thins crushed sheet 120.

Referring generally to FIG. 13 and particularly to e.g. FIG. 5, the instant paragraph pertains to example 23 of the present disclosure. According to example 23, which includes the subject matter of any of examples 21-22, above, forming crushed sheet 120 further comprises advancing press 130 along surface 136 of second precursor sheet 110 (FIG. 13, block 234).

Press 130 is advanced along surface 136 of second precursor sheet 110. For example, press 130 may roll along surface 136. Alternatively, press 130 may exert a compressive force along one portion of second precursor sheet 110, such compressive force may be removed, press 130 may be moved to another portion of second precursor sheet 110 and press 130 may again exert a compressive force against the new portion of second precursor sheet 110. Advancing press 130 along surface 136 allows crushing of different portions of second precursor sheet 110.

Referring generally to FIG. 13 and particularly to e.g. FIG. 5, the instant paragraph pertains to example 24 of the present disclosure. According to example 24, which includes the subject matter of example 23, above, advancing press 130 along surface of second precursor sheet 110 comprises rolling press 130 along surface 136 (FIG. 13, block 236).

Press 130 may be advanced by rolling press along surface 136. For example, press 130 may be rolled in a rotation direction 158 about axis 156. Crushed portions of second precursor sheet 110 may be spread before or during rolling press 130 to the next area of second precursor sheet 110.

Referring generally to FIG. 13 and particularly to e.g. FIGS. 5-9, the instant paragraph pertains to example 25 of the present disclosure. According to example 25, which includes the subject matter of any of examples 21-24, above, method 200 further comprises limiting the compressive force exerted by press 130 on second precursor sheet 110 by providing at least one compression stop 142 between press 130 and substrate 140 supporting second precursor sheet 110 (FIG. 13, block 238).

Compression stops 142 control the compressive force exerted on second precursor sheet 110, which may prevent over crushing second precursor sheet 110. For example, exerting too high of a compressive force on second precursor sheet 110 may pulverize or otherwise crush second precursor sheet 110 into fragments 126 that are too small, which may limit the length of reinforcement fibers 104 to a length that is too short to be effective.

Compression stops 142 are provided on substrate 140. Compression stops 142 may be rails mounted to substrate 140. Compression stops 142 limit compression of second precursor sheet 110. Compression stops 142 control thickness of crushed sheet 120 by crushing second precursor sheet 110 until second precursor sheet 110 is at a predetermined thickness. Press 130 may roll along compressing stops 142. Optionally, compression stops 142 may define an outer edge or border for fragments 126, limiting width of crushed sheet to a width between compression stops 142.

Referring generally to FIG. 13 and particularly to e.g. FIGS. 6 and 9, the instant paragraph pertains to example 26 of the present disclosure. According to example 26, which includes the subject matter of example 25, above, thickness 144 of compression stop 142 is equal to second thickness 122 of crushed sheet 120.

Compression stops 142 control the compressive force exerted on second precursor sheet 110, which may prevent over crushing second precursor sheet 110. For example, exerting too high of a compressive force on second precursor sheet 110 may pulverize or otherwise crush second precursor sheet 110 into fragments 126 that are too small, which may limit the length of reinforcement fibers 104 to a length that is too short to be effective.

Substrate 140 supports second precursor sheet 110 and compression stops 142. Crushed sheet 120 may be crushed until fragments 126 are at or below an outer surface of compression stops 142. As such, thickness 144 of compression stops 142 defines thickness 122 of crushed sheet 120.

Referring generally to FIG. 13 and particularly to e.g. FIGS. 5-6, the instant paragraph pertains to example 27 of the present disclosure. According to example 27, which includes the subject matter of any of examples 1-16, above, forming crushed sheet 120 further comprises applying a compressive force to second precursor sheet 110 (FIG. 13, block 230) and applying a spreading force to second precursor sheet 110 (block 240).

Spreading force induces lateral movement of fragments 126 to spread fragments 126. Crushed sheet 120 is thinned as fragments 126 are spread.

In an exemplary embodiment, crushed sheet 120 if formed by applying a compressive force to second precursor sheet 110 and applying a spreading force to second precursor sheet 110. The compressive force and spreading force may both be applied by press 130. Alternatively, the compressive force may be applied by press 130 or another component and the spreading force may be applied by press 130 or another component. The compressive force may be applied in a generally vertical direction and the spreading force may be applied in a generally horizontal direction. The compressive force cracks second precursor sheet to break fragments 126 apart and form interstices 128. The spreading force spreads fragments 126 apart thinning crushed sheet 120.

Referring generally to FIG. 13, the instant paragraph pertains to example 28 of the present disclosure. According to example 28, which includes the subject matter of example 27, above, the spreading force comprises a force of vibration.

Vibration induces lateral movement of fragments 126 to spread fragments 126. Spreading of fragments 126 thins crushed sheet 120.

Referring generally to FIG. 13, the instant paragraph pertains to example 29 of the present disclosure. According to example 29, which includes the subject matter of any of examples 27-28, above, the spreading force is applied while applying the compressive force.

In an exemplary embodiment, the spreading force and compressive force are applied simultaneously by press 130. Applying the spreading force spreads fragments 126 creating room or space for new fragments 126 to spread into. The overall time of manufacturing thinned prepreg sheet 100 is reduced by applying the spreading force simultaneously with the compressive force.

Referring generally to FIG. 13 and particularly to e.g. FIGS. 5-6, forming crushed sheet 120 further comprises crushing second precursor sheet 110 into fragments 126 by compressing second precursor sheet 110 in first direction 150 (FIG. 13, block 242). Forming crushed sheet 120 also comprises spreading fragments 126 of second precursor sheet 110 in second direction 152 transverse to first direction 150 (block 244). The preceding subject matter of the instant paragraph is in accordance with example 30 of the present disclosure, and example 30 includes the subject matter of any of examples 1-16, above.

Spreading fragments 126 widens crushed sheet 120, leading to a corresponding thinning of crushed sheet 120. Spreading fragments 126 creates room or space for new fragments 126 to spread into.

Second precursor sheet 110 is compressed in first direction 150, which may be a horizontal direction, to create interstices 128 and fragments 126. Fragments 126 are spread in second direction 152, which may be a horizontal direction, transverse to first direction 150. For example, fragments 126 may be spread side-to-side to widen crushed sheet 120. Second direction 152 may be perpendicular to first direction 150; however is not limited to being perpendicular.

Referring generally to FIG. 13 and particularly to e.g. FIG. 5, the instant paragraph pertains to example 31 of the present disclosure. According to example 31, which includes the subject matter of example 30, above, forming crushed sheet 120 further comprises spreading fragments 126 of second precursor sheet 110 in third direction 154 transverse to first direction 150 and transverse to second direction 152 (FIG. 13, block 246).

Spreading fragments 126 in multiple directions increases the surface area of crushed sheet 120, leading to a corresponding thinning of crushed sheet 120. Spreading fragments 126 creates room or space for new fragments 126 to spread into.

Fragments 126 of second precursor sheet 110 are spread in third direction 154, which may be a horizontal direction. Third direction 154 may be transverse to first direction 150 and transverse to second direction 152. Third direction 154 may be perpendicular to first direction 150 and/or second direction 152; however is not limited to being perpendicular. Third direction 154 may be an end-to-end direction, whereas second direction 152 may be a side-to-side direction. Spreading fragments 126 in second direction 152 may widen crushed sheet 120. Spreading fragments 126 in third direction 154 may lengthen crushed sheet 120.

Referring generally to FIG. 13, the instant paragraph pertains to example 32 of the present disclosure. According to example 32, which includes the subject matter of any of examples 30-31, above, spreading fragments 126 of second precursor sheet 110 comprises maintaining the average size of interstices 128.

Fragments 126 of second precursor sheet 110 are spread while maintaining an average size of interstices 128 between fragments 126. For example, fragments 126 remain in close contact with each other. Interstices 128 are small spaces between fragments 126 and, even when spread, interstices 128 remain small spaces between fragments 126. For example, prior to spreading, many layers of fragments 126 may be provided and, after spreading, fewer layers of fragments 126 are provided; however the average size of interstices 128 is maintained irrespective of the number of layers. Spreading of fragments 126 corresponds to thinning of crushed sheet 120.

Referring generally to FIG. 13 and particularly to e.g. FIGS. 3-4, the instant paragraph pertains to example 33 of the present disclosure. According to example 33, which includes the subject matter of any of examples 1-32, above, second precursor sheet 110 has first width 114 and crushed sheet 120 has second width 124 greater than first width 114.

Widening crushed sheet 120 increases the surface area of crushed sheet 120, leading to a corresponding thinning of crushed sheet 120. Spreading fragments 126 creates room or space for other fragments 126 to spread into.

Spreading fragments 126 may widen crushed sheet 120. As such, second precursor sheet 110 may have first width 114, whereas crushed sheet 120 may have second width 124 which is greater than first width 114. Spreading fragments 126 may occur during crushing. For example, press 130 used to crush second precursor sheet 110 may also be vibrated to spread fragments 126. Fragments may be spread in other ways in other embodiments. For example, substrate 140 may be vibrated or shaken to spread fragments 126.

Referring generally to FIG. 13 and particularly to e.g. FIG. 11, the instant paragraph pertains to example 34 of the present disclosure. According to example 34, which includes the subject matter of any of examples 1-33, above, heating crushed sheet 120 comprises thawing crushed sheet 120 (FIG. 13, block 250).

Thawing crushed sheet 120 causes crushed sheet 120 to become thinner. For example, matrix resin 106 may become fluid and fill space occupied by interstices 128 in crushed sheet 120, thus reducing volume of crushed sheet 120 and thinning crushed sheet 120.

Thawing crushed sheet 120 lowers the viscosity of matrix resin 106. Reducing the viscosity of matrix resin 106 causes matrix resin 106 to act more like a fluid than in the frozen or cooled state. Thawing matrix resin 106 may or may not cause a phase change from a solid or semi-solid state to a liquid or semi-liquid state of matrix resin 106. Thawing matrix resin 106 causes matrix resin 106 to be sufficiently flowable to eliminate interstices 128. Thawing matrix resin 106 causes matrix resin 106 to become a continuous uniform structure as opposed to crushed sheet 120 which includes fragments 126 separated by interstices 128. Crushed sheet 120 may be thawed at an elevated temperature. The temperature for thawing is above freezing point of matrix resin 106. Optionally, the temperature for thawing may be above room temperature. The temperature for thawing may be elevated. Optionally, the temperature for thawing may be below a curing temperature of matrix resin 106.

Referring generally to FIG. 13 and particularly to e.g. FIG. 11, the instant paragraph pertains to example 35 of the present disclosure. According to example 35, which includes the subject matter of any of examples 1-33, above, heating crushed sheet 120 comprises melting matrix resin 106 of crushed sheet 120 (FIG. 13, block 252).

Melting crushed sheet 120 causes crushed sheet 120 to become thinner. For example, matrix resin 106 may become fluid and fill space occupied by interstices 128 in crushed sheet 120, thus reducing volume of crushed sheet 120 and thinning crushed sheet 120.

Melting crushed sheet 120 lowers the viscosity of matrix resin 106. Reducing the viscosity of matrix resin 106 causes matrix resin 106 to act more like a fluid than in the frozen or cooled state. Melting matrix resin 106 may or may not cause a phase change from a solid or semi-solid state to a liquid or semi-liquid state of matrix resin 106. When matrix resin 106 is frozen in the second state, melting crushed sheet 120 may cause thawing of matrix resin 106. Melting matrix resin 106 causes matrix resin 106 to be sufficiently flowable to eliminate interstices 128. Melting matrix resin 106 causes matrix resin 106 to become a continuous uniform structure as opposed to crushed sheet 120 which includes fragments 126 separated by interstices 128. Crushed sheet 120 may be melted at an elevated temperature. The temperature for melted is above the freezing point of matrix resin 106. Optionally, the temperature for melted may be above room temperature. The temperature for melted may be elevated. Optionally, the temperature for melted may be below a curing temperature of matrix resin 106.

Referring generally to FIG. 13 and particularly to e.g. FIG. 11, the instant paragraph pertains to example 36 of the present disclosure. According to example 36, which includes the subject matter of any of examples 1-35, above, heating crushed sheet 120 comprises consolidating crushed sheet 120 (FIG. 13, block 254).

Consolidating crushed sheet 120 causes crushed sheet 120 to become thinner. For example, matrix resin 106 may become fluid and fill space occupied by interstices 128 in crushed sheet 120, thus reducing volume of crushed sheet 120 and thinning crushed sheet 120.

Consolidating crushed sheet 120 may occur by reducing or eliminating interstices 128. Consolidating matrix resin 106 causes matrix resin 106 to become a continuous uniform structure as opposed to crushed sheet 120 which includes fragments 126 separated by interstices 128. Consolidating may occur by thawing or melting matrix resin 106 to lower viscosity of matrix resin 106, causing matrix resin 106 to seep into interstices 128.

Referring generally to FIG. 13, the instant paragraph pertains to example 37 of the present disclosure. According to example 37, which includes the subject matter of example 36, above, consolidating crushed sheet 120 further comprises applying a compressive force to crushed sheet 120 (block 256).

Applying compressive force to consolidate crushed sheet 120 may allow consolidation to occur at a lower temperature. For example, consolidation may occur when matrix resin 106 has a higher viscosity if the compressive force is applied.

Compressive force is applied to crushed sheet 120 during heating and consolidating of crushed sheet 120 to force matrix resin 106 to fill interstices 128 and consolidate fragments 126. Compressive force may be applied by press 130 or by another structure.

Referring generally to FIG. 13, the instant paragraph pertains to example 38 of the present disclosure. According to example 38, which includes the subject matter of any of examples 1-37, above, heating crushed sheet 120 comprises decreasing a viscosity of matrix resin 106 in crushed sheet 120 (block 258).

Decreasing viscosity of matrix resin 120 allows matrix resin 106 to become flowable and fill space occupied by interstices 128 in crushed sheet 120, thus reducing volume of crushed sheet 120 and thinning crushed sheet 120.

Decreasing the viscosity of matrix resin 106 causes matrix resin 106 to act more like a fluid than in the frozen or cooled state. Decreasing viscosity may occur by increasing the temperature of matrix resin 106. For example, when matrix resin 106 is frozen in the second state, melting or thawing of crushed sheet 120 may cause a decrease in viscosity of matrix resin 106. Decreasing viscosity causes matrix resin 106 to be flowable to eliminate interstices 128.

Referring generally to FIG. 13 and particularly to e.g. FIG. 11, the instant paragraph pertains to example 39 of the present disclosure. According to example 39, which includes the subject matter of any of examples 1-38, above, heating crushed sheet 120 comprises filling interstices 126 in crushed sheet 120 with matrix resin 106 of crushed sheet 120 (FIG. 13, block 260).

Decreasing viscosity causes matrix resin 106 to be flowable to eliminate interstices 128. For example, decreasing the viscosity of matrix resin 106, such as by heating matrix resin 106, causes matrix resin 106 to act more like a fluid than in the frozen or cooled state. Decreasing viscosity of matrix resin 120 allows matrix resin 106 to become flowable and fill space occupied by interstices 128 in crushed sheet 120, thus reducing volume of crushed sheet 120 and thinning crushed sheet 120. Optionally, matrix resin 106 may completely fill all interstices 128.

Referring generally to FIG. 13, the instant paragraph pertains to example 40 of the present disclosure. According to example 40, which includes the subject matter of any of examples 1-39, above, heating crushed sheet 120 comprises heating crushed sheet 120 to a temperature above a freezing temperature and below a curing temperature of matrix resin 106.

Crushed sheet 120 is heated to a temperature above the freezing temperature of matrix resin 106 to allow matrix resin 106 to become flowable. Crushed sheet 120 is heated to a temperature below the curing temperature of matrix resin 106 to delay the curing process. As such, after crushed sheet 120 is transformed to the third state, the prepreg sheet is still workable to form into a part.

Referring generally to FIG. 13, the instant paragraph pertains to example 41 of the present disclosure. According to example 41, which includes the subject matter of any of examples 1-40, above, method 200 further comprises cooling thinned prepreg sheet 100 after forming thinned prepreg sheet 100 (block 210).

When cooled, thinned prepreg sheet 100 may be handled, stored or shipped. For example, matrix resin 106 has sufficient shape holding strength to allow thinned prepreg sheet 100 to be handled.

The prepreg sheet is heated after being crushed to unify or consolidate matrix resin from fragments 136 into a uniform structure. Heat is applied to crushed sheet 120 to consolidate matrix resin 106. After heat is applied, and matrix resin 106 is consolidated, thinned prepreg sheet 100 is cooled to again raise viscosity of matrix resin 106. Matrix resin 106 is cooled to slow the curing process.

Referring generally to FIG. 13, the instant paragraph pertains to example 42 of the present disclosure. According to example 42, which includes the subject matter of example 41, above, method 200 further comprises cooling thinned prepreg sheet 100 to about 100° F. or below.

When cooled, thinned prepreg sheet 100 may be handled, stored or shipped. For example, matrix resin 106 has sufficient shape holding strength to allow thinned prepreg sheet 100 to be handled. Matrix resin 106 is cooled to slow the curing process.

The prepreg sheet is heated after being crushed to unify or consolidate matrix resin from fragments 136 into a uniform structure. Heat is applied to crushed sheet 120 to consolidate matrix resin 106. After heat is applied, and matrix resin 106 is consolidated, thinned prepreg sheet 100 is cooled to again raise viscosity of matrix resin 106, such as to a temperature far below the curing temperature of matrix resin 106, such as cooled to about 100° Fahrenheit or below.

Examples of the present disclosure may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will conic to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A method (200) of forming a thinned prepreg sheet (100), the method comprising:
providing a first precursor sheet (102) comprising reinforcement fibers (104) impregnated with a matrix resin (106) in a first state;
forming a second precursor sheet (110) having a first thickness (112) by cooling the first precursor sheet (102) until the matrix resin (106) is transformed from the first state to a second state;
forming a crushed sheet (120) comprising interstices (128) having an average size, wherein the crushed sheet (120) has a second thickness (122), by crushing the second precursor sheet (110); and
forming the thinned prepreg sheet (100), wherein the thinned prepreg sheet (100) has a third thickness (132) less than the first thickness (112) of the second precursor sheet (110), by heating the crushed sheet (120) until the matrix resin (106) is transformed from the second state to a third state.

2. The method (200) according to claim 1, wherein, in the first state, the matrix resin (106) is uncured.

3. The method (200) according to claim 1, wherein providing the first precursor sheet (102) comprises impregnating the reinforcement fibers (104) with the matrix resin (106) in the first state.

4. The method (200) according to claim 3, wherein, in the first state, the matrix resin (106) is sufficiently flowable to impregnate the reinforcement fibers (104).

5. The method (200) according to claim 1, wherein providing the first precursor sheet (102) comprises providing a prepreg sheet.

6. The method (200) according to claim 5, wherein, in the first state, the matrix resin (106) is partially cured.

7. The method (200) according to claim 1, wherein, in the second state, the matrix resin (106) is crushable.

8. The method (200) according to claim 1, wherein, in the third state, the matrix resin (106) is sufficiently flowable to fill the interstices (128) of the crushed sheet (120).

9. The method (200) according to claim 1, wherein cooling the first precursor sheet (102) until the matrix resin (106) is transformed from the first state to the second state comprises freezing the first precursor sheet (102).

10. The method (200) according to claim 1, wherein forming the crushed sheet (120) further comprises crushing the second precursor sheet (110) into fragments (126) partially separated by the interstices (128).

11. The method (200) according to claim 10, wherein forming the crushed sheet (120) further comprises spreading the fragments (126) of the second precursor sheet (110) along a plane.

12. The method (200) according to claim 11, wherein spreading the fragments (126) of the second precursor sheet (110) along the plane comprises maintaining the average size of the interstices (128) between the fragments (126).

13. The method (200) according to claim 10, wherein spreading the fragments (126) of the second precursor sheet (110) along the plane comprises vibrating the fragments (126).

14. The method (200) according to claim 10, wherein forming the crushed sheet (120) further comprises applying a compressive force to the second precursor sheet (110) with a press (130).

15. The method (200) according to claim 14, wherein forming the crushed sheet (120) further comprises vibrating the press (130).

16. The method (200) according to claim 14, wherein forming the crushed sheet (120) further comprises advancing the press (130) along a surface (136) of the second precursor sheet (110).

17. The method (200) according to claim 16, wherein advancing the press (130) along the surface (136) of the second precursor sheet (110) comprises rolling the press (130) along the surface (136).

18. The method (200) according to claim 1, wherein heating the crushed sheet (120) comprises melting the matrix resin (106) of the crushed sheet (120).

19. The method (200) according to claim 1, wherein heating the crushed sheet (120) comprises consolidating the crushed sheet (120).

20. The method (200) according to claim 1, wherein heating the crushed sheet (120) comprises filling the interstices (128) in the crushed sheet (120) with the matrix resin (106) of the crushed sheet (120).

* * * * *